United States Patent [19]

Shigematsu et al.

[11] Patent Number: 5,704,016
[45] Date of Patent: Dec. 30, 1997

[54] TEMPORAL LEARNING NEURAL NETWORK

[75] Inventors: Yukifumi Shigematsu; Gen Matsumoto, both of Tsukuba, Japan

[73] Assignee: Agency of Industrial Science & Technology, Ministry of International Trade & Industry, Tokyo, Japan

[21] Appl. No.: 405,963

[22] Filed: Mar. 17, 1995

[30] Foreign Application Priority Data

Mar. 23, 1994 [JP] Japan ................... 6-078003

[51] Int. Cl.$^6$ .................................. G06F 15/18
[52] U.S. Cl. ................ 395/27; 395/21; 395/23; 395/24
[58] Field of Search ................ 395/27, 24, 21, 395/11, 22, 23

[56] References Cited

U.S. PATENT DOCUMENTS

| 4,994,982 | 2/1991 | Duranton et al. ............ 395/27 |
| 5,402,522 | 3/1995 | Alkon et al. ............... 395/24 |
| 5,452,402 | 9/1995 | Sakiyama et al. ........... 395/27 |

FOREIGN PATENT DOCUMENTS 6-83994   3/1994   Japan .

OTHER PUBLICATIONS

International Symposium on Neural Information Processing, Jul. 12-15, 1992, Kyushu Institute of Technology, Iizuka, Fukuoka, Japan, A Dynamic Neural Cell Model Driven by Pulse Train, Yukifumi Shigematsu, Gen Matsumoto and Syuji Akiyama Electrotechnical Laboratory, pp. 130-133.

Haykin, Simon. Neural Networks: A Comprehensive Foundation. Macmillan College Publishing Co. pp. 49-53, 1994.

*Primary Examiner*—Tariq R. Hafiz
*Assistant Examiner*—Jason W. Rhodes
*Attorney, Agent, or Firm*—Oblon, Spivak, McClelland, Maier & Neustadt, P.C.

[57] ABSTRACT

A temporal learning neural network includes a plurality of temporal learning neural processing elements and an input/output control section. Each element includes a calculation device and a learning device. The calculation device includes an input memory section and a response calculation circuit. The learning device includes a learning processing circuit and a history evaluation circuit. The calculation circuit calculates a sum of a total summation value of a product of input values and connection efficacies, and an internal potential, compares the sum with a predetermined threshold value, outputs a 1 or 0 signal depending on the comparison and substitutes internal potential of a next time for the sum. The processing circuit receives an input history evaluation value when the calculation circuit has produced an output 1 signal which strengthens, weakens or leaves unchanged the connection efficacies depending on the comparison. The evaluation circuit obtains an input history value, compares the obtained input history value with the learning threshold value, generates an evaluation signal and distributes the evaluation signal to the input memory section. The input/output control section is provided with input terminals and output terminals, sends signals input from the calculation circuit and evaluation circuit to the input memory section, receives signals output from the calculation circuit and evaluation circuit, and effects communication with each of the processing elements. This process is an input temporal associative learning process.

4 Claims, 8 Drawing Sheets

TEMPORAL LEARNING NEURAL NETWORK

BACKGROUND OF THE INVENTION

1. Field of the Invention

The present invention relates to a temporal learning neural network that uses a plurality of temporal neural learning processing elements that can effect information processing and control on the basis of time sequence information that is learned and memorized, which enables neural networks to be implemented in hardware as integrated circuitry.

2. Description of the Prior Art

There have been analog and digital methods for integrating neural networks in which conventional neural processing elements are used. Among the problems of analog implementations are that the number of connection lines has to be increased when the number of processing elements is increased, and that it is difficult to freely vary input connection efficacies and maintain them for long periods of time. Problems with digital implementations include the need to use precision multiplication circuits to calculate connection efficacies for signal inputs, the time-consuming nature of the multiplying and summing processes and the complexity of the non-linear calculations. As conventional neural processing elements are basically operated by the transmission of analog signals between elements, the numbers of connection lines and the complexity of the calculations involved make it difficult to implement them as large-scale integrated circuits.

As a new method of integrating neural processing elements that resolves problems relating to connection efficacy and lines, JP-A-6-83994 disclose a pulse-driven neural processing element that can simplify calculations and can be implemented by a simple digital circuit arrangement. However, as yet there is no learning method for this processing element. Back-propagation and Hebbian learning rules are two of the learning processes used in the teaching of neural networks. These learning methods are static in the temporal processing, and as such do not take time sequence relationships into account, meaning they do not relate to temporal associative learning. There have been some experimental integrated neural circuits using a back-propagation learning method. However, the fact that the learning processes have been calculated based on all information in the network results in complex learning circuitry, and no large-scale integration.

The present inventors have proposed a learning procedure for a pulse-driven neural network that uses time sequential input. This is a revised Hebbian learning rule, involving local input and output information and less calculation than back-propagation based learning. At each response output, this learning method obtains a time correlation by comparing input history values with a learning threshold and making appropriate adjustments to the strengths of the connections.

As yet, no method has been forthcoming for integrating this learning method into the above pulse-driven neural processing elements in the form of a circuit. The reason is that although input/output responses can be calculated using digital input/output line connections, input history values are needed to calculate the learning procedures, but obtaining history values of each input to each element involves a large amount of computation. The number of calculations can be reduced by calculating the history values of element outputs instead of inputs, and then transferring these values to the elements as input history values. However, since these histories are analog values, a complex line arrangement and a large memory capacity are required to enable these signals to be transferred to each of the input sections. This has been a barrier to the digital circuit integration of large numbers of processing elements, and to the realization of an integrated circuit capable of learning time sequences relationships. With respect also to training a multilayer neural network for pattern recognition applications, as yet there are no means for establishing how teaching signals are to be used to train the neural network to fire selected output elements corresponding to an input pattern.

An object of the present invention is to provide a temporal learning neural network using a plurality of temporal neural learning elements, that have temporal learning capabilities and in which element learning calculations are simple and can be carried out at high speed; use simplified learning connections between elements that enable large numbers of elements to be digitally integrated; enable large-scale systems to be constructed by forming multiplicities of elements into groups and linking the groups, using simple, reliable signal connections between elements; and in which, when configured as a multilayer network learning is facilitated by the use of induction signals to select arbitrary output layer elements.

SUMMARY OF THE INVENTION

To attain the above object, the present invention provides a temporal learning neural network comprising a substrate, a plurality of temporal learning neural processing elements integrated on the substrate, and an input/output control section; each of the processing elements comprising calculation means and learning means.

The calculation means can comprise means for inputting a plurality of signal pulses, an input memory section for holding a plurality of input signals input from the means, and a response calculation circuit. The response calculation circuit calculates a sum of (a) a total summation value of a product of (i) input values to the input memory section and (ii) corresponding input terminal connection efficacies, and (b) an internal potential remaining in a processing element at a current time, which is obtained by decaying the internal potential of the processing element at a preceding time. The sum forms an accumulated value. The response calculation circuit compares the accumulated value with a predetermined threshold value and, (1) when the accumulated value exceeds the predetermined threshold value, outputs an output 1 signal and stores, as the internal potential of the processing element at a subsequent time, a value obtained by deducting a constant from the accumulated value, and (2) when the accumulated value does not exceed the predetermined value, outputs an output 0 signal and stores the accumulated value as the internal potential of the processing element of subsequent time. The learning means can comprise a learning processing circuit and a history evaluation circuit. When the response calculation circuit has produced an output 1 signal, the learning processing circuit receives from the history evaluation circuit an input history evaluation value (positive/negative/zero) to (1) strengthen the connection efficacies when the evaluation value is positive, (2) weaken the efficacies when the evaluation value is negative and (3) leave the connection efficacies unchanged when the evaluation value is zero, thereby generating new connection efficacies. In order to determine the input history evaluation value, the history evaluation circuit obtains an input history value input from the processing element at a preceding time by using an output history value of the processing element of the preceding time for the input history value, compares the obtained input history value with two learning threshold values, an enhancement threshold value and a decrease threshold value, uses the input history evaluation value so that the connection efficacies are (1) strengthened when the obtained input history value is equal to or higher than the enhancement threshold value, (2) weakened when the obtained input history value is less than the enchantment threshold value and is equal to or higher than the decreased threshold value near zero and (3) left unchanged when the obtained input history value is lower than the decreased threshold value close to zero, and distributes the evaluation value (positive/negative/zero) to the input memory section of each of the processing elements as the input history value of each of the processing elements. The input/output control section sends signals input from the response calculation circuit and from the history evaluation circuit to the input memory section of each of the plurality of processing elements, receives signals output from the response calculation circuit and from the history evaluation circuit, and communicates with each of the processing elements, thereby enabling input temporal associative learning processing.

The temporal learning neural network can comprise a plurality of substrates, on each of which a plurality of processing elements have been integrated, wherein temporal associative learning is applied to the processing elements between the plurality of substrates to form an associative memory system in which temporal relationships can be stored. The neural network can also be provided with means for training selected output processing elements through the use of teaching or induction signals.

The pulse-driven processing element according to this invention enables signals to be transmitted between elements, using multiple address lines and a single data line. In the learning process it is necessary to obtain input history values. Calculation performance can be enhanced by obtaining the values on the output side of the elements and transferring the values to the elements as input histories. Also, learning is localized by each input history value and output firing signal of the element. This eliminates the need for the type of complex calculations required by the back-propagation method and enables learning to take place no matter how complex the element interconnections. Connection efficacy adjustment equations were re-examined with the aim of minimizing the number of additional connection lines required for the learning process. As a result, a system has been incorporated which compares inputs with a learning threshold and generates an evaluation value indicating whether a connection efficacy should be increased or decreased. Only the evaluation value is transferred, so just two data lines are needed for the learning process.

In the temporal learning neural network according to this invention, based on the above system, operating mode ON/OFF signals and learning mode signals to increase, decrease or not change connection efficacies are all digital. This means that connections between elements or element boards can be freely configured to form large systems, using just the address lines and two data lines. Moreover, for training aimed at obtaining a response from specific output elements for a particular pattern, induction signals corresponding to an input can be directly input to output elements to elicit the desired output pattern by increasing the firing probability of the elements concerned.

In accordance with this invention, response and learning processes can be accomplished using simple calculations, and as such can be implemented by simple digital circuits, which can be formed into integrated circuits. The elements thus integrated can be formed into modules each functioning as a single unit. These modules can be linked to form systems with higher-level functions.

The above and other features of the present invention will become apparent from the following description made with reference to the drawings.

BRIEF DESCRIPTION OF THE DRAWINGS

FIG. 2 (a) illustrates input memory and response calculation in the dement of FIG. 1;

FIG. 2 (b) illustrates evaluation processing by the history evaluation circuit in the element of FIG. 1;

FIG. 2 (c) illustrates the operation of the learning processing circuit in the element of FIG. 1;

FIG. 7 (a) illustrates the operation of a temporal learning network element;

FIG. 7 (b) shows an example of input signals to the element of FIG. 7 (a);

FIG. 7 (c) shows an example of input history values in the element of FIG. 7 (a);

FIG. 7 (d) shows an example of signal output from the element of FIG. 7 (a);

FIG. 7 (e) shows an example of a time course of the input history value;

FIG. 7 (f) shows an example of a time course of the connection efficacy change during learning;

DESCRIPTION OF THE PREFERRED EMBODIMENTS

Figure 1:
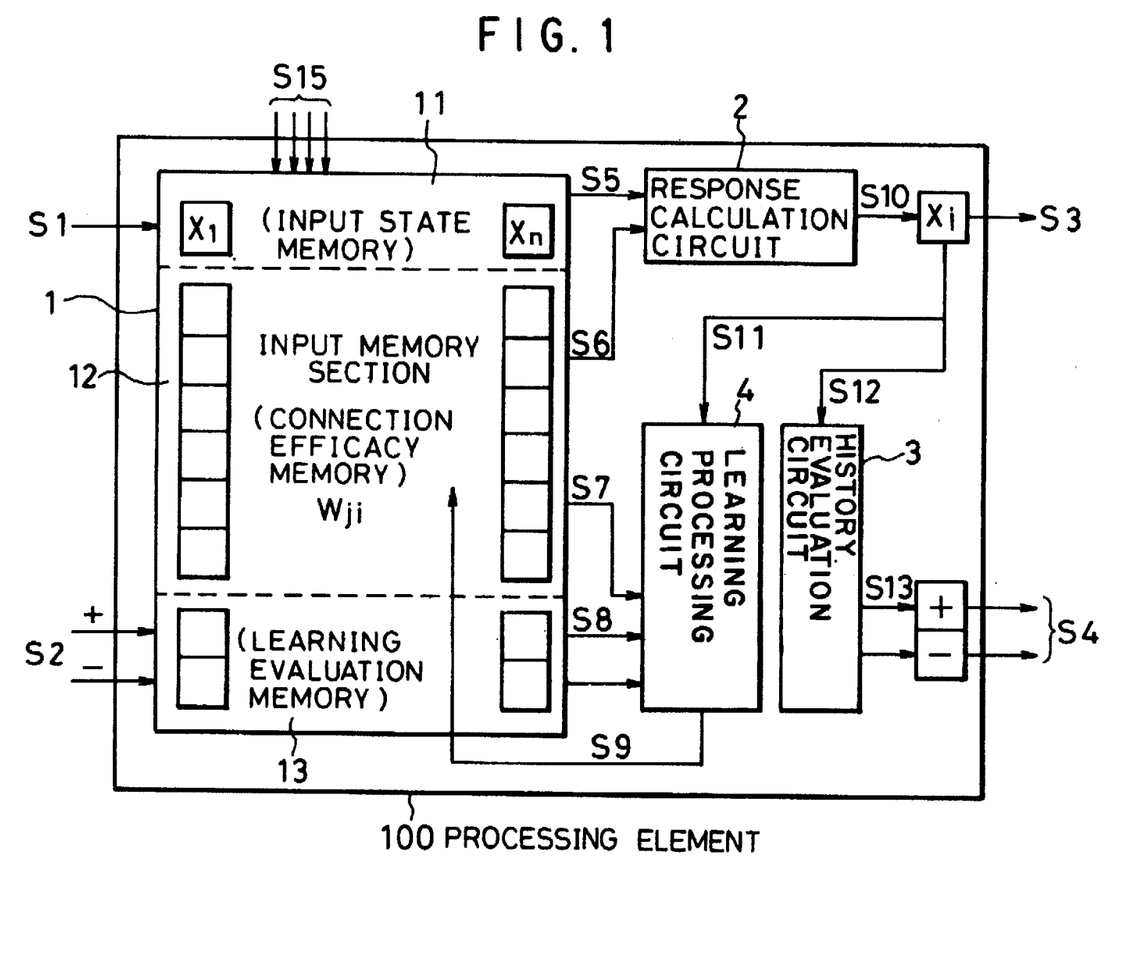
FIG. 1 is a block diagram of the temporal learning processing element according to the invention.

An embodiment of the invention will now be described with reference to the drawings. FIG. 1 is a block diagram showing an arrangement of the principal parts of an embodiment of a temporal learning neural processing element 100 according to the present invention. The processing element 100 is comprised of an input memory section 1, a response calculation circuit 2, a history evaluation circuit 3 and a learning processing circuit 4. The input/output pulse-driven response element disclosed in JP-A-6-83994 is used for the input memory section 1 and response calculation circuit 2 input/output response portions of the processing element 100. The operation of the neural processing element will now be described with reference to FIGS. 8, 9 and 10.

Figure 8:
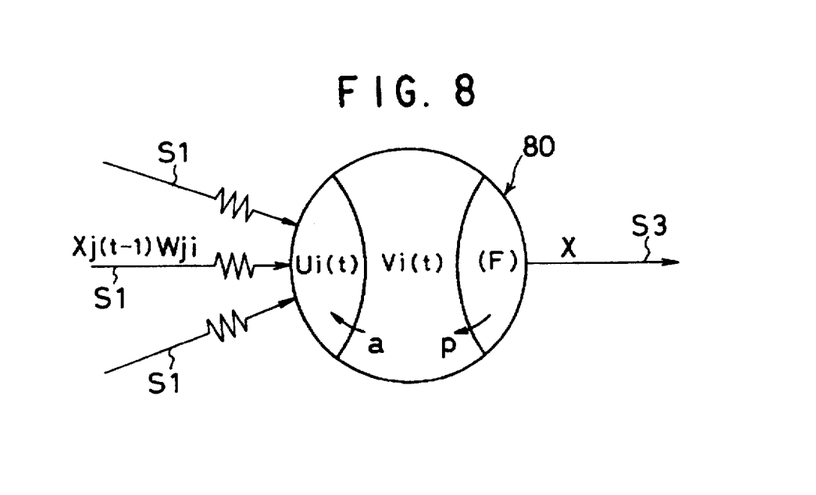
FIG. 8 shows the input and output operation in a prior art pulse-driven neural processing element.

Element 80 in FIG. 8 is assumed to be the i-th element that responds to inputs from other elements. $X_j$ is an input pulse signal from a j-element that is input to the i-element at a synaptic (connection) efficacy $W_{ji}$ and accumulated in the element. Internal potential $V_i$ remaining in the element is added to accumulated potential $U_i$ in the next time interval as a $V_i$, 'a' being a decay constant (0<a<1) for $V_i$. A discrete time interval is used for the processing of this operation, which is expressed as follows.

$$U_i(t) = \sum_{j=1}^{N} W_{ji} X_j(t-1) + aV_i(t-1) \quad (1)$$

This calculation is very simple, since the value of $X_j$ is "1" or "0". Accumulated potential $U_i$ is compared with a pulse generation threshold T. If the value of $U_i$ exceeds the threshold value, a pulse is generated ($X_i$=1), and a value obtained by subtracting a constant 'p' from $U_i$ remains in the next step as internal potential $V_i$. If the value of $U_i$ is less than the threshold value, no pulse is generated ($X_i$=0), and $U_i$ remains unchanged as internal potential $V_i$. This can be described by the following equation.

If $U_i(t) \geq T(2)$, then $X_i(t)=1$ and $V_i(t)=V_i(t)-p$

If $U_i(t)<T(2)$, then $X_i(t)=0$ and $V_i(t)=U_i(t)$ \quad (2)

The above operations are iteratively performed in parallel for each of the processing elements to calculate and obtain an output response.

Figure 9:
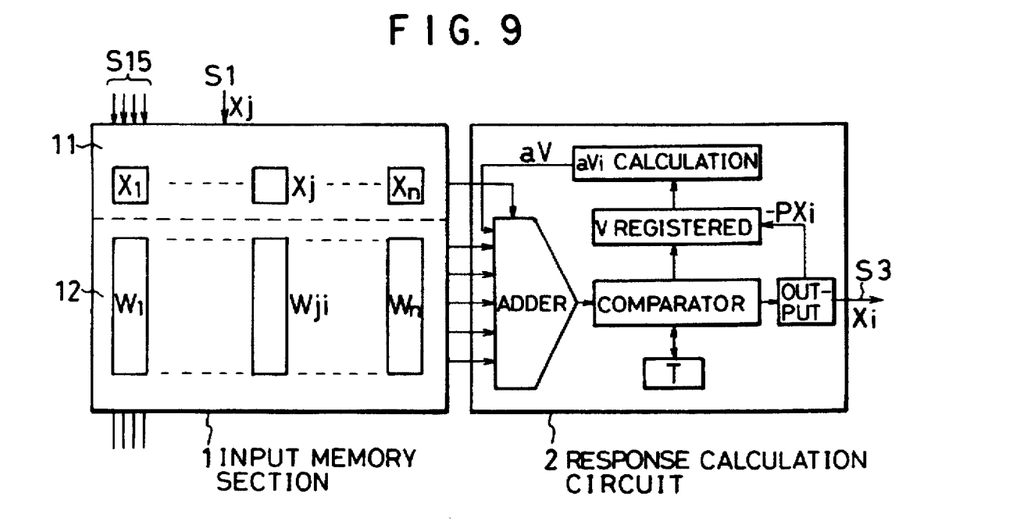
FIG. 9 is a block diagram showing an example of digital circuits used to form the element of FIG. 8.
Figure 10:
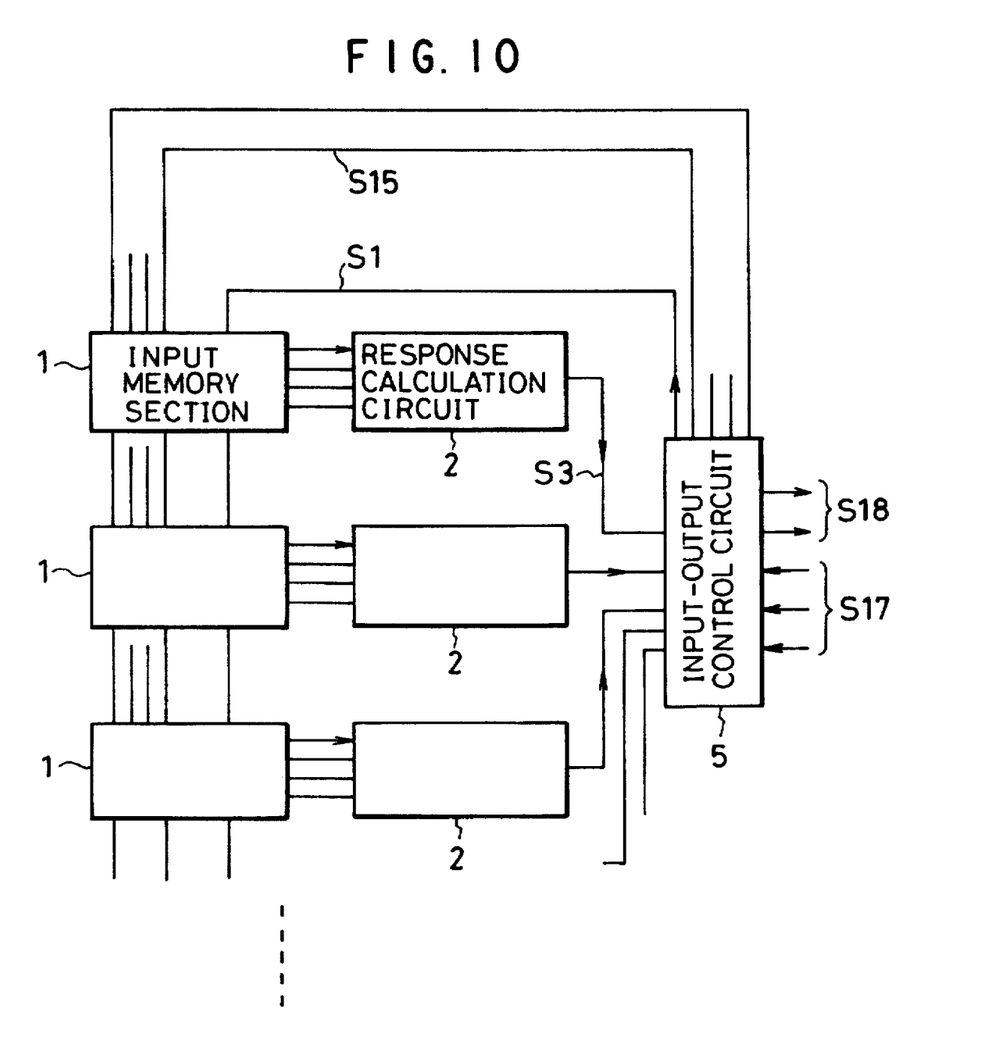
FIG. 10 is a block diagram of a neural network according to the present invention, configured by connecting a plurality of the elements of FIG. 9.

FIG. 9 shows the digital circuitry used to constitute a response calculation section comprised of an input memory section 1 and a response calculation section 2. As an input pulse is either 1 or 0, the integration calculation of equation (1) is merely a matter of adding $W_{ji}$, which is $X_j$=1. a$V_i$ is calculated by multiplying $V_i$ by the decay constant 'a', so there is no need for a complex circuit implementation. Equation (2) only involves numerical comparison and subtraction calculations that can be done using a simple digital circuit arrangement. Data is input and output as 1s and 0s, so by using a time division serial transfer arrangement, the data can be transferred by means of the address lines S15 and data line S1 arrangement shown in FIG. 10. Also, if a digital memory is used for each processing element, $W_{ji}$ can be held and easily changed as desired. As described by JP-A-6-83994, this processing element arrangement is well-suited to integration in the form of digital circuit elements. Information is processed by a neural network of these processing elements.

Figure 7A:
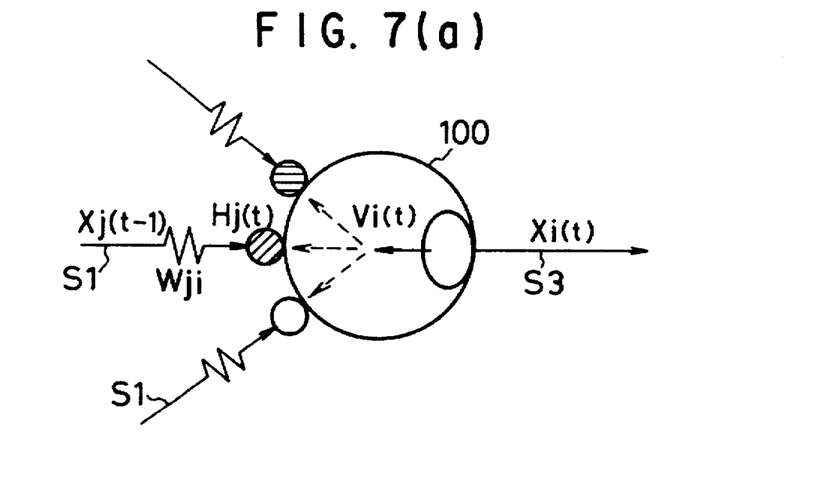
Figure 7B:
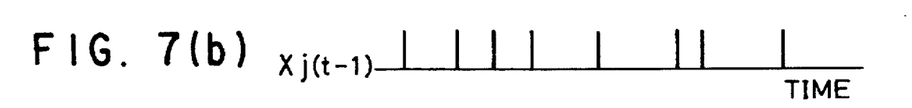
Figure 7C:
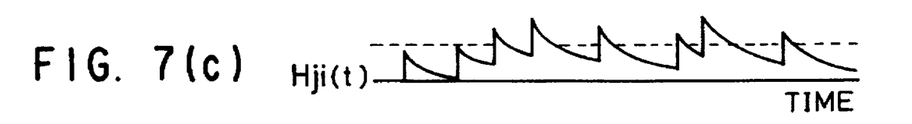
Figure 7D:
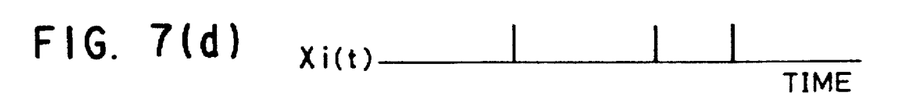
Figure 7E:
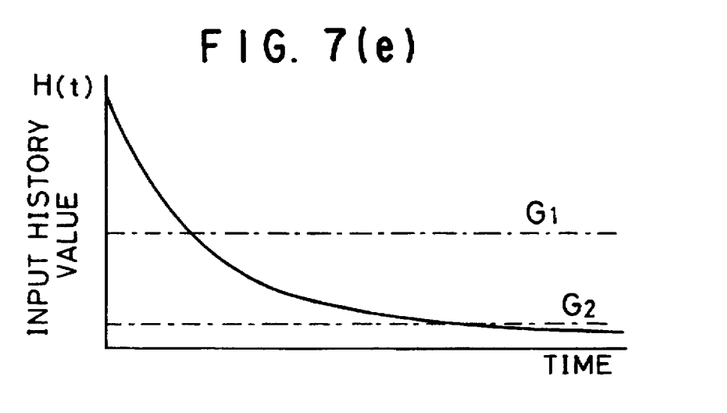
Figure 7F:
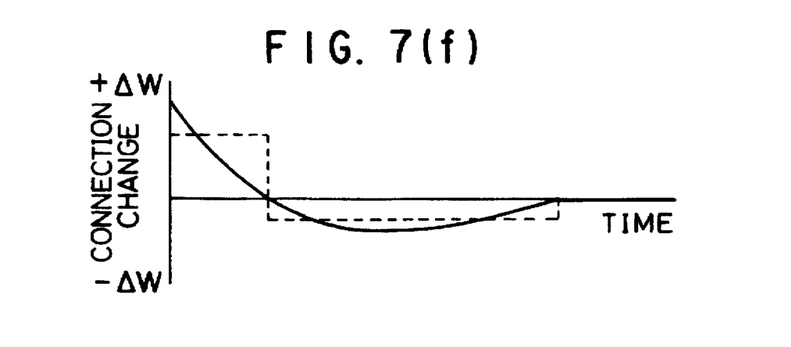

The learning function added to the processing elements will now be described. Basically the neural network temporal learning method of JP-A-5-345321, depicted in FIG. 7, is applied in the form of a pulse-driven learning rule. To describe this learning method with respect to FIG. 7, a history value $H_{ji}(t)$ of pulses input from a j-element such as those of the pulse train $X_j(t)$ shown in FIG. 7 (b) is calculated and stored at an input portion provided on the processing element 100 shown in FIG. 7 (a). This input history value is incremented by a constant 'q' at the input of each pulse signal ($X_j$=1), and then decays, as shown in FIG. 7 (c). If 'd' is the history decay constant (0<d<1), history value $H_{ji}(t)$ can be expressed as follows.

$$H_{ji}(t)=d \cdot H_{ji}(t-1)+q \cdot X_j(t-1) \quad (3)$$

During the learning operation the connection efficacy $W_{ji}$ is changed when an element is fired by a strong input signal, generating the output signal ($X_i(t)$=1) shown in FIG. 7 (d). When this pulse firing takes place, each input history is compared with learning thresholds to determine whether the connection efficacy $W_{ji}$ is to be enhanced, decreased, or unchanged. With reference to FIG. 7 (e), which shows the decay of the synaptic history, two learning threshold levels are set, which are an enhancement threshold level G1 and a decrease threshold level G2 (G1>G2>0). In this way, the direction of the learning process is determined by comparison of the input history values $H_{ji}(t)$ with the learning thresholds G1 and G2. FIG. 7(f) shows that the connection efficacy increases if the element fires in a short time from its receipt of an input signal and that it decreases if the firing is weakly correlated with the input signal. Also, broken lines in the graph shows approximated lines and how to simplify the learning process calculation by taking the constant increasing level and constant decreasing one. That is, connection efficacy $W_{ji}$ is enhanced if $H_{ji}(t) \geq G1$, decreased if $G1>H_{ji}(t) \geq G2$, unchanged if $G2>H_{ji}(t)$ when the output element is fired, while with respect to an element that does not fire, $W_{ij}$ remains unchanged.

Input connections can be excitatory or inhibitory. A connection efficacy $W_{ji}$ can be calculated as excitatory when it is positive, or inhibitory when it is negative. The connection efficacy has some physiologically limited range and therefore it is necessary to take into consideration such a limitation in the calculation for the connection efficacy change. If Wmax and Wmin are set as maximum and minimum values, respectively, of the connection efficacy $W_{ij}$, k1 is a learning rate increase constant and k2 a learning rate decrease constant, the change in connection efficacy $\Delta W_{ji}$ of an element that has fired is calculated as follows.

Enhancement:

If $H_{ji}(t) \geq G1$, then $W_{ji}=k1(Wmax-W_{ji})$ \quad (4)

Decrease:

If $G1>H_{ji}(t) \geq G2$, then $W_{ji}=k2(Wmin-W_{ji})$ \quad (5)

The value $(Wmin-W_{ji})$ in equation (5) is always negative and k2 is a positive constant.

If Wmax and Wmin are represented by Wm, and k1 and k2 by k, the preceding two equations can be expressed as follows.

$$\Delta W_{ji}=k(Wm-W_{ji}) \quad (6)$$

Calculation can be simplified by making the following omissions. With respect to input history values $H_{ji}$ that are actually integrated, as connection efficacy $W_{ji}$ is also involved, $H_{ji}(t)$ multiplied by $W_{ji}$ should be compared with learning thresholds G1 and G2. However, as initial values for $W_{ji}$ are randomized and the emphasis is on time sequence, the effect of $W_{ji}$ values on history values is ignored, and only $H_{ji}(t)$ is compared to G1 and G2. Also, while the degree of change $\Delta W$ is related to $H_{ji}$ and to G1 and G2, for simplicity the rate of learning enhancement/decrease is taken as being a constant k1/k2. This simplification reduces the learning calculations. For example, to obtain the $H_{ji}$ for each input without obtaining all input history values for each processing element, the history value at the output side of each element can be obtained and used to calculate a coefficient of learning by transferring the history value to each processing element.

The following problems used to be encountered when a circuit has been added in which a learning function has been imprinted by the above learning process. If the history is obtained at the output side and transferred to the input portion of each element, since the history value $H_j$ is an analog quantity, the number of lines required to transmit the information to the elements became a problem, while another problem was the memory capacity required to store the information at each element. These problems made circuit implementation of the method impossible, and also seemed contradictory with respect to the use of pulse-driven elements, and the simplified 1-bit response data connections between elements.

It will now be explained how these problems have been solved in accordance with the present invention, by realizing a digital integrated neural network having a temporal learning function comprised by processing elements 100 each having the input memory section 1, response calculation circuit 2, history evaluation circuit 3 and learning processing circuit 4 shown in FIG. 1. In FIG. 1, the input memory section 1 is comprised of an input state memory 11, a connection efficacy memory 12 and a learning evaluation memory 13. S1 denotes response input, S2 evaluation input, S3 response output, S4 evaluation output, S5 to S8 are input memory section 1 outputs, S9 is connection efficacy changing output obtained by learning process, S10 is the output of the response calculation circuit 2, S11 is input to the learning processing circuit 4, S12 is input to the history evaluation circuit 3, and S13 is output of the history evaluation circuit 3.

Figures 2A, 2B, 2C:
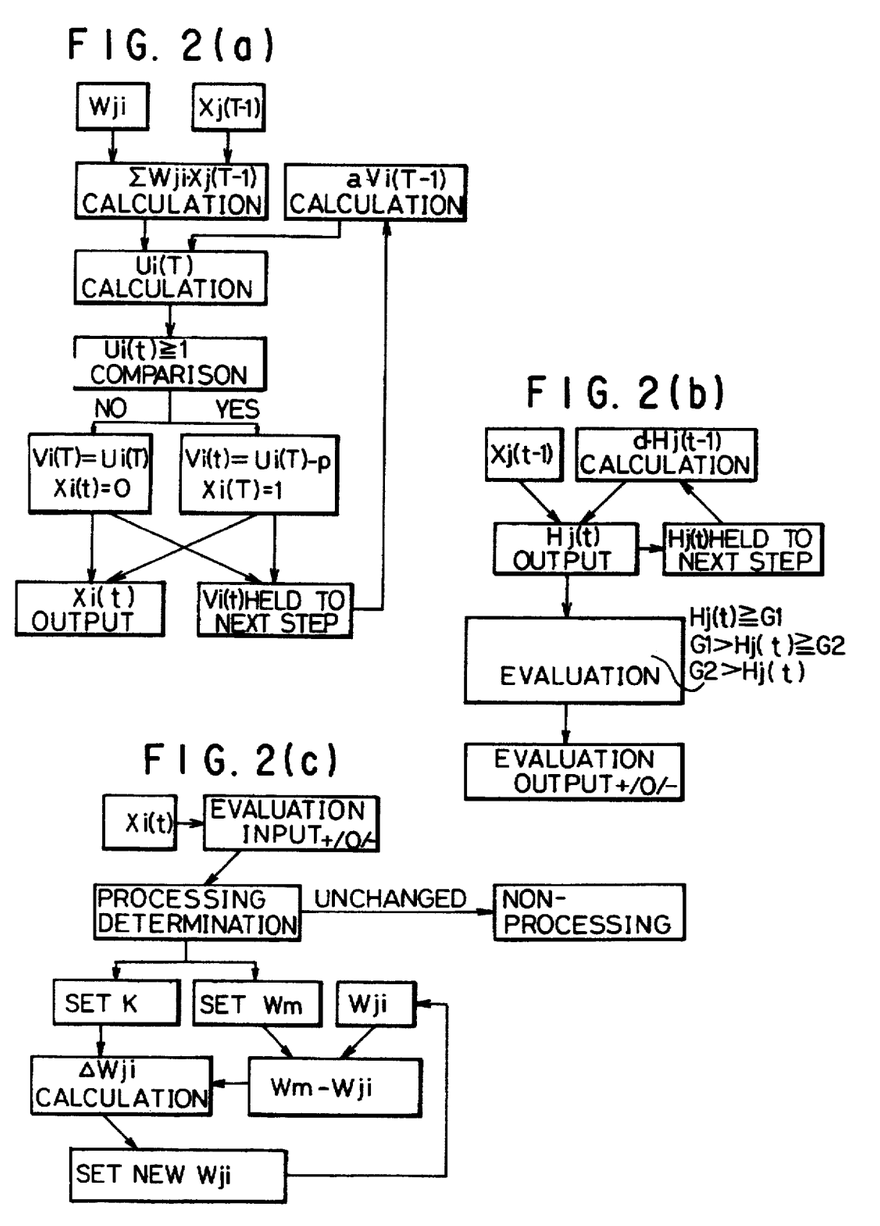

With reference to FIG. 1, a circuit 3 that processes and evaluates output history values is added to the processing element thus constituted by the input state memory 11 and connection efficacy memory 12 of the input memory section 1 and the digital response calculation circuit 2, of which the processing steps are shown in FIG. 2 (a). As shown by FIG. 2 (b), in the processing means of the history evaluation circuit 3, a constant multiplication circuit is used to obtain the decayed history value $dH_j$, and calculation of equation (3) in which the output value thus obtained is incremented by q each time there is an output $X_j$, forms an adder. Before the history value thus obtained at the output side is transmitted to the input side of each processing element, it is compared with a learning threshold and processed until an evaluation value is attained concerning whether the connection efficacy should be increased, decreased or left unchanged. This evaluation value is then sent to the evaluation value memory of each element's input section. As the evaluation value is not more than two bits, it is possible to economize on storage memory resources, and the data can be transmitted serially over two lines.

Based on the transmitted evaluation value results, connection efficacies are trained by the addition of the learning processing circuit of FIG. 1 to perform the calculations of equations (4) and (5). FIG. 2 (c) shows the content of the processing by the circuit. First, a circuit is formed to confirm the processing element has generated an output pulse and to discriminate whether the evaluation is an increase, decrease, or no change evaluation. Equation (6) is used to obtain $\Delta W_{ji}$. For this, for an increase Wmax is substituted for Wm and k1 for k, and for a decrease Wmin is substituted for Wm and k2 for k, a subtraction circuit is used to obtain $(Wm-W_{ji})$, and $\Delta W_{ji}$ is then obtained by using a constant multiplication circuit to multiply the obtained value by constant k. An adder circuit is then used to obtain the new $W_{ji}$ from $(W_{ji}+\Delta W_{ji})$, and the connection efficacy is rewritten. The above is the added learning processing circuit 4.

The learning evaluation memory 13, the history evaluation circuit 3 having means for the processing shown in FIGS. 2 (a) and (b), and the learning processing circuit 4 are the only circuits added for the connection efficacy-based learning process. These are simple digital circuits for performing discrimination, constant multiplication and addition and subtraction and the like and can be readily integrated. With respect to the evaluation value, by using a "1" first bit to signify an increase, a "1" second bit to signify a decrease and "0" first and second bits to signify no change, the evaluation signal does not exceed two bits and can be transmitted by adding just two lines, keeping down the number of lines and the size of the memory. When response data and/or evaluation data are sent to each element as a stream of serial data, address lines are used to address the location of each element's input state memory and learning evaluation memory. This can be done using ten address lines in the case of 1,024 elements, and eleven lines for 2,048 elements.

Regarding this operation of a processing element as one cycle of synchronized operations, with reference to FIG. 1, first the input is set, and the element output response is processed is response mode. Then there is a switch to learning mode, and the learning processing circuit uses the previous evaluation output response to calculate any change in the connection efficacy. The connection efficacy is then adjusted, and history value calculation and evaluation is performed for the next step. Thus, the operation comprises repeated cycles of the two operating modes of response and learning. If high-speed response calculation is required, the learning procedure does not have to be calculated for each response. Instead, each cycle could be comprised of a number of response calculations and history evaluations that is followed by one learning processing.

A neural network system can be configured by integrating a thousand or so processing elements 100 on a single board or substrate. An input/output control unit 5 of FIG. 3 transmits response and evaluation input data to the input memory section of each of the processing elements 100. The output control unit 5 also receives response and evaluation outputs from the elements, and also functions as an external signal interface. The lines S17 and S18 of the input/output control circuits are also communication lines with other processing units, such as sensor devices, actuators and digital computers. Taking the circuits integrated on a single substrate as a function module, a system can be formed by combining large numbers of modules. As signalling between elements is digitally implemented, the neural network of this invention is reliable. Modules can be readily interconnected by using three data lines, address lines, and control lines for clocks, modes, and so forth, and the arrangement allows large-scale systems to be implemented. Input and output lines can be time shared by controlling the timing of signals used in response and learning modes.

In the above learning evaluation, learning thresholds G1 and G2 are used to discriminate between whether connection efficacy is to be increased, decreased or not changed, using equations (4) and (5). However, the arrangement can be simplified by using just threshold G1. In this case, when an element fires the connection efficacy is increased if $H_j \geq G1$, and decreased if $G1 > H_j$. This makes it possible to transmit learning evaluation data using a single line, providing further simplification. In the case of such an arrangement, "learning" would have a slightly different meaning. Connection efficacy would still be increased when inputs/outputs are well time-correlated. In other cases, however, pulse firing would result in a decrease in the connection efficacy. This enables learning to be conducted more efficiently when teaching output elements to respond to just a specific input pattern. The number of stages into which learning evaluation is divided depends on the number of learning evaluation data lines used. As such, either the number of evaluation data lines can be increased to obtain detailed, multivalue evaluation, or simpler evaluation can be obtained using fewer lines. Either option can be selected as required.

Figure 3:
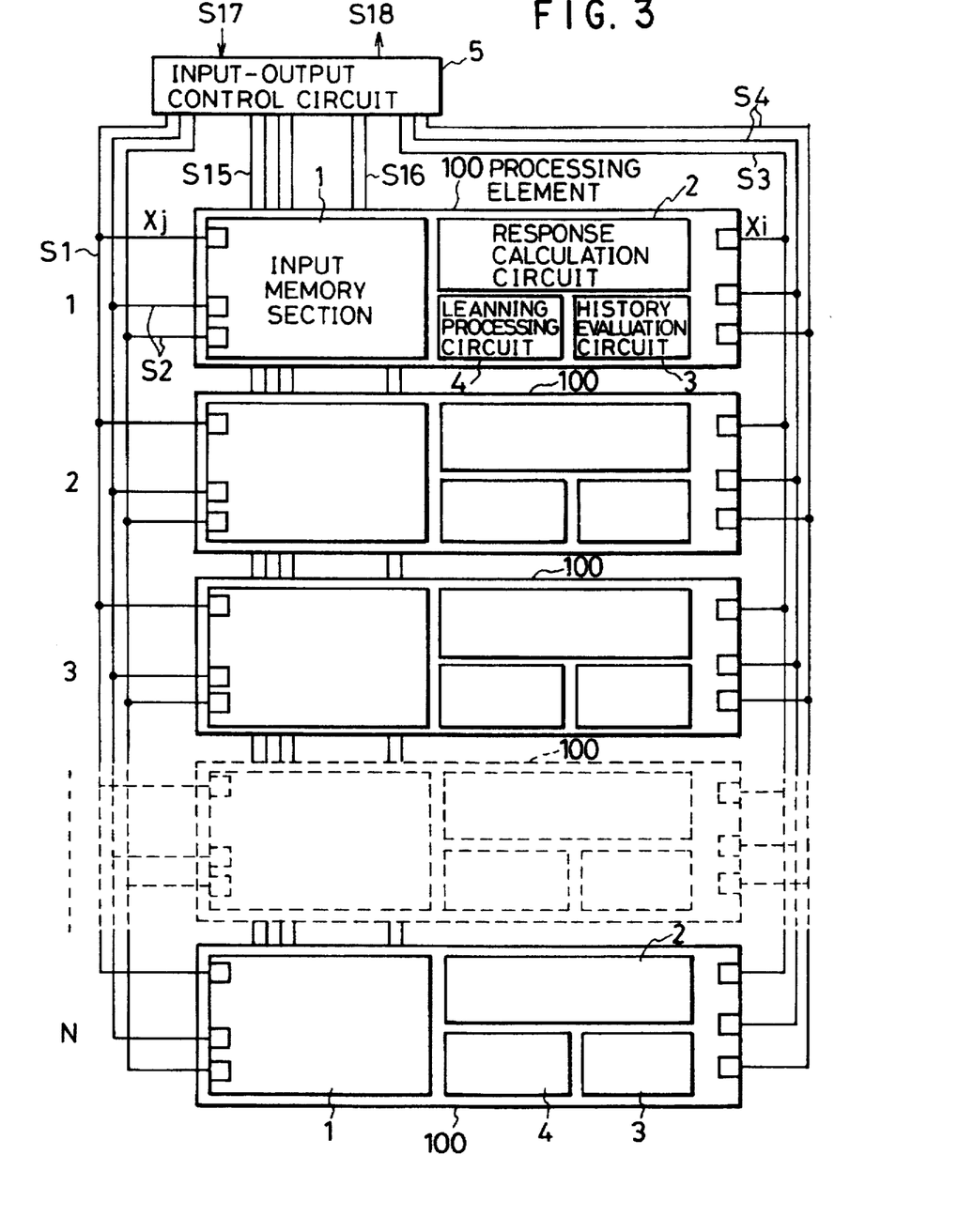
FIG. 3 shows a temporal learning neural network according to the invention, configured using the elements of FIG. 1.
Figure 4:
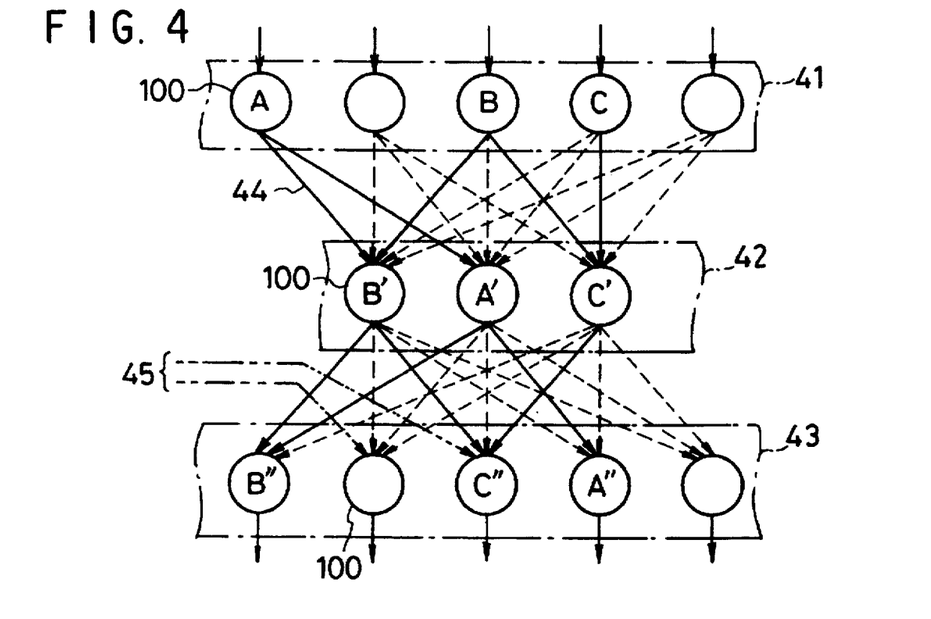
FIG. 4 illustrates the operation of a multilayer neural network arrangement.

In general there are two types of neural networks. In one type the processing elements are interconnected, while in the other type, shown in FIG. 4, the elements are connected in layers. When integrated circuits are used to form an interconnected network configuration, as shown in FIG. 3, it is only necessary for output and input values to be given a one-to-one correspondence at the input/output control section, and to iteratively write the values to the same address. The other neural network configuration can adapt to the way the input memory section 1 is used by the input/output control section. The network of FIG. 4 is comprised of an input layer 41, hidden layer 42 and output layer 43. Since the processing elements in each layer are not interconnected with other elements in the layer, there will be a total mismatch between input and output patterns. For example, a method may be used in which input pattern data A B C from the input layer 41 is received by the input/output control section and written into the input state memory and learning evaluation memory in the input memory section of the processing elements 100 of the hidden layer 42, and a response is calculated, and the outcome of this processing, A' B' C' in this example, is then transmitted to the input/output control section as evaluation output data for input/output control and connection of processing elements 100 of the output layer 43. Reference numeral 44 denotes connection lines between processing elements 100, and 45 denotes induction or teaching signal input lines.

For circuits with interconnections combined with direct input or external connections, memory can be divided for different requirements. For example, one part of the input memory may be used for interconnections and the other part for direct input or external connections. Specifically, N elements that are interconnected and M input terminals that are connected for external elements can be handled by preparing input memory for N+M connection efficacy, enabling memory sections 1-N to be used for interconnections and the remaining M parts for external connections. In this way, the neural network according to this invention is adaptable to various circuit connection arrangements including circuits having complex recurrent loops and the like, and there is no problem since learning rules relate to local inputs and outputs.

A learning method will now be shown having output selection means for selectively obtaining a desired output for an input, when an input firing pattern is to be changed to a certain output pattern, using the multilayer network configuration of FIG. 4. Connections are formed in the multilayer network whereby teaching and induction signals having a time correlation with input layer 41 signals (A, B, C) are directly input to processing elements 100 of the output layer 43 that it is desired to fire. Since the resultant firing of the output layer 43 elements receiving the teaching signals (elements A", B", C") is temporally correlated with the input signals, connection efficacies between input layer 41 and hidden layer 42 elements and the selected output layer elements are strengthened, thereby enabling learning to take place to form an associative memory whereby a desired selected output pattern (A", B", C") can be obtained for an input pattern (A, B, C).

Figure 5:
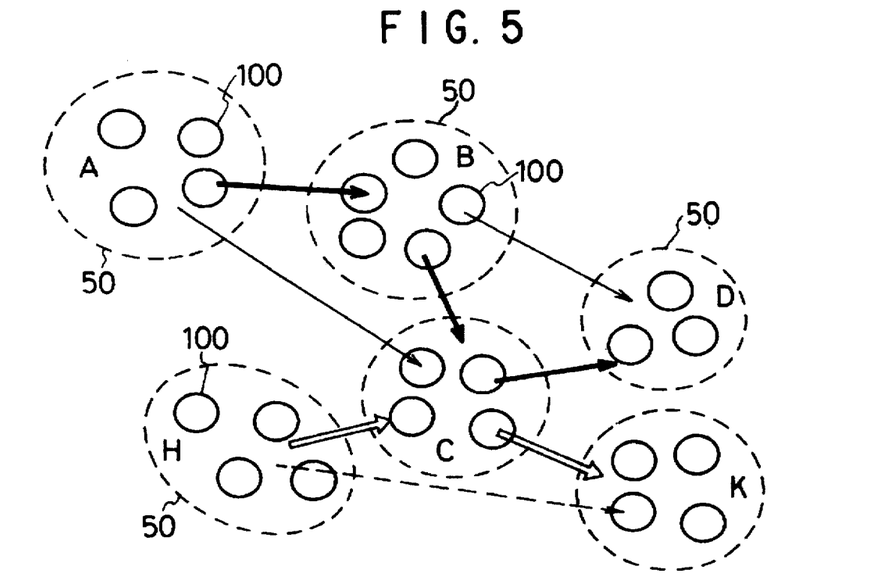
FIG. 5 illustrates the operation of a temporal associative memory network.

The formation of a temporal associative memory will now be shown, using a network of temporal learning elements 100 interconnected as shown in FIG. 5. To start with, weak connections are established between neural processing element groups A, B, C, D, H, and K. It is assumed that as a result of an input signal, the elements of Group A fire, then the elements of Group B. A check of the history values of all Group B element inputs shows a large history value for the input from Group A, so connection A→B is strengthened. If then Group C fires, then Group D, in accordance with the same temporal learning signal paths B→C and C→D will be strengthened. Through these learning iterations, an input pattern is imprinted on the synaptic connections of the network. For recall, an input is applied to Group A, causing Group A to fee. Owing to connection A→B, Group B fires and is read, then Groups C and D, in time order (see the bold arrows in FIG. 5).

The temporal learning method is not limited to strengthening of direct primary connections such as A→B and B→C. Recall performance can be enhanced by changing parameters to strengthen secondary connections with a broad time width such as A→C or B→D. Take as an example two temporal patterns A→B→C→D and H→C→K intersecting at Group C that were imprinted at the same time. If the recall process were started from Group H, Group C is recalled after H, and next, Group K would be more easily recalled than Group D owing to secondary connection H→K, thereby enabling the intersecting pattern H→C→K to be recalled (see the open arrows in the drawing). Experience-based learning of this type could be used to form a temporal associative memory network able to predict a subsequent state.

Figure 6:
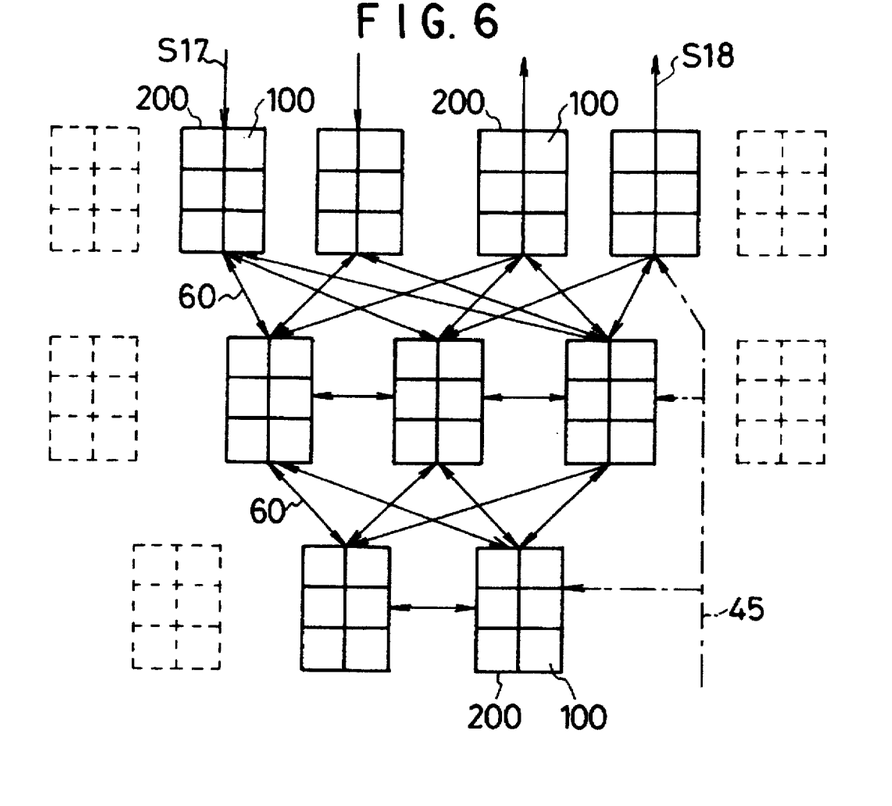
FIG. 6 shows the arrangement of a large-scale neural network system comprised of function modules.

In the network system arrangement shown in FIG. 6, processing elements 100 according to this invention are integrated into input/output modules, intermediate modules and higher level modules, each having a particular function. By associating large numbers of modules as in FIG. 6, temporal learning can be used to extend network links via module interconnection lines 60 to form large, dynamic neural network systems. When supervised learning is required, an active pattern can be taught using induction or teaching signals corresponding to an input pattern that are applied to the appropriate modules via teaching signal lines 45. Since modules can be connected by digital pulse signals links, it is possible to build large-scale neural information processing systems without the noise problem and signal decrease that are concerns in the case of analog signals.

As described in the foregoing, the temporal learning network element according to this invention includes a plurality of input means, an input memory section, a response calculation circuit, a learning processing circuit and a history evaluation circuit. Because the temporal learning method comprises simple comparison, subtraction and addition operations, it has the advantage that it can be constituted using simple digital circuits that can be used to form large-scale integrated neural networks. Even with the inclusion of response input/output signals and learning evaluation signals, since input and output signals are digital, elements and integrated circuits can be linked using reliable digital connections and a low number of lines. This makes it possible to form large systems by linking numerous groups of processing elements.

With respect to the temporal learning neural network of the invention, the elements thus integrated can be formed into modules each functioning as a single unit. These modules can be combined to produce systems with higher-level functions. Taking the circuits integrated on a single substrate as a function module, a system can be formed by combining large numbers of modules. As signalling between elements is digitally implemented, the neural network of this invention is reliable. Modules can be readily interconnected by using three data lines, address lines, and control lines for clocks, modes, and so forth, and the arrangement allows large-scale systems to be implemented. Input and output lines can be time shared by controlling the timing of signals used in response and learning modes.

Function modules can be formed by integrating pluralities of the above processing elements on a single substrate. By then grouping together pluralities of these modules and applying temporal associative learning between modules, a system can be formed in which time relations can be associatively stored. In addition, the network has means that can be taught to select output elements, by using teaching or induction signals. An input control section enables the input memory section to be flexibly used for different purposes, such as for inputs from outputs of other modules or for the output of signals to the outputs of other modules. As such, temporal learning can be applied to networks formed of circuits that are interconnected or connected in layers, to produce temporal associative memory circuits.

The temporal learning method has a locality determined by just element input/output, and can therefore be adapted to various circuit configurations including interconnection circuits and feedback circuits. By applying a teaching signal to elements on the output side, circuit output can be controlled and an associative memory circuit formed having an arbitrary output pattern. A natural learning method with a physiologically plausible function is implemented by the present invention as a neural network. A temporal flow of events can be accurately stored in the network's synaptic connections, and recalled, similarly to the way a nervous system functions. As the network can handle temporally dynamic phenomena, it can be used to realize high-level neural networks such as a temporal associative memory that can use experience to predict a subsequent state. That is, in the neural circuit it will be possible to form logical circuits that incorporate a temporal cause-and-effect relationship, enabling high-level information processing that is even closer to a human central nervous system.

What is claimed is:

1. A temporal learning neural network for implementing input temporal associative learning, the neural network comprising:

a substrate, a plurality of temporal learning neural processing elements integrated on said substrate, and an input/output control section including input terminals and output terminals;

each of said processing elements comprising:
  learning means, and
  calculation means comprising:
    an input memory section with inputting means for inputting a plurality of signal pulses, and means for storing the signal pulses input from said inputting means, and
    a response calculation circuit which calculates a sum of (a) a total summation value of a product of (i) input values to said input memory section and (ii) corresponding input terminal connection efficacies, and (b) an internal potential remaining in the processing element at a current time, which is obtained by decaying the internal potential of the processing element at a preceding time, the sum forming an accumulated value, said response calculation circuit including comparing means for comparing the accumulated value with a predetermined threshold value and, (i) when the accumulated value exceeds the predetermined threshold value, outputting an output 1 signal, and storing, as the internal potential for the processing element at a subsequent time, a value obtained by deducting a constant from the accumulated value, and (ii) when the accumulated value does not exceed the predetermined threshold value, outputting an output 0 signal and storing the accumulated value as the internal potential of the processing element of the subsequent time, said learning means comprising:
    a history evaluation circuit for determining an input history evaluation value, and
    a learning processing circuit for generating new connection efficacies in a processing element wherein said calculation circuit has output an output 1 signal, by receiving an input history evaluation value from said history evaluation circuit, the input history evaluation value (i) strengthening the connection efficacies when the evaluation value is positive, (ii) weakening the connection efficacies when the evaluation value is negative and (iii) leaving the connection efficacies unchanged when the evaluation value is zero, wherein said history evaluation circuit includes:
      means for using an input history value of the processing element of the preceding time for the input history value of the processing element of a current time, which is obtained by accumulating the input signals with decay,
      means for comparing the input history value with an enhancement learning threshold value and a decreased learning threshold value, generating the input history evaluation value whereby a changing direction for the connection efficacies is (i) positive when the obtained input history value is equal to or higher than the enhancement learning threshold value, (ii) negative when the obtained input history value is lower than the enhancement learning threshold value and is equal to or higher than the decreased threshold value, or (iii) zero when the obtained input history value is lower than the decreased threshold value, and
      means for distributing the input history evaluation value to the input memory section of each of the processing elements, and
  wherein said input/output control section includes
    means for receiving at said input terminals (i) the output 1 and output 0 signals output from said response calculation circuit and (ii) the input history evaluation value from said history evaluation circuit, and
    means for sending, from said output terminals, the signals input from said response calculation circuit and from said history evaluation circuit, to said input memory section of each of said plurality of processing elements.

2. A neural network according to claim 1, further comprising:

a plurality of substrates on each of which said plurality of processing elements have been integrated, and wherein temporal associative learning is applied to said processing elements between said plurality of substrates to form an associative memory system for storing temporal relationships; and means for training selected output processing elements using at least one of teaching and induction signals.

3. A neural network according to claim 1, wherein said plurality of processing elements are divided into a plurality of groups having input terminals and output terminals connected respectively to said output terminals and said input terminals of said input/output control section.

4. A neural network according to claim 1, wherein said input/output control section further comprises means for connecting to an external circuit.

* * * * *